(12) United States Patent
Singh et al.

(10) Patent No.: US 12,460,143 B2
(45) Date of Patent: Nov. 4, 2025

(54) METHOD TO CAPTURE AND UTILIZE $CO_2$ AND AN INSTALLATION FOR CAPTURING AND UTILIZING $CO_2$

(71) Applicant: Universiteit Gent, Ghent (BE)

(72) Inventors: Varun Singh, Ghent (BE); Vladimir Galvita, Lochristi (BE); Mark Saeys, Zottegem (BE); Guy Marin, Ghent (BE)

(73) Assignee: Universiteit Gent, Ghent (BE)

( * ) Notice: Subject to any disclaimer, the term of this patent is extended or adjusted under 35 U.S.C. 154(b) by 513 days.

(21) Appl. No.: 17/783,012

(22) PCT Filed: Dec. 8, 2020

(86) PCT No.: PCT/EP2020/084996
§ 371 (c)(1),
(2) Date: Jun. 7, 2022

(87) PCT Pub. No.: WO2021/116064
PCT Pub. Date: Jun. 17, 2021

(65) Prior Publication Data
US 2023/0028243 A1    Jan. 26, 2023

(30) Foreign Application Priority Data

Dec. 9, 2019 (EP) ................... 19214419

(51) Int. Cl.
*B01D 53/62* (2006.01)
*B01D 53/82* (2006.01)
(Continued)

(52) U.S. Cl.
CPC ............. *C10K 1/32* (2013.01); *B01D 53/62* (2013.01); *B01D 53/82* (2013.01); *B01J 20/041* (2013.01);
(Continued)

(58) Field of Classification Search
CPC .......... C10K 1/32; C10K 1/005; C10K 3/026; B01D 53/62; B01D 53/82;
(Continued)

(56) References Cited

U.S. PATENT DOCUMENTS

| | | | |
|---|---|---|---|
| 4,971,605 A * | 11/1990 | Tarman ................. | B01D 53/04 95/143 |
| 5,509,362 A | 4/1996 | Lyon | |
| 5,914,455 A * | 6/1999 | Jain .................... | B01D 53/0462 95/122 |
| 6,547,854 B1 * | 4/2003 | Gray ................... | B01J 20/3204 423/230 |

(Continued)

FOREIGN PATENT DOCUMENTS

| CA | 2340822 A1 | 9/2001 |
|---|---|---|
| EP | 1413546 A1 | 4/2004 |

(Continued)

OTHER PUBLICATIONS

Galvita et al.: "Combined chemical looping for energy storage and conversion", Journal of Power Sources, Elsevier SA, CH, vol. 286, Mar. 31, 2015 (Mar. 31, 2015), pp. 362-370, XP029220251, ISSN: 0378-7753, DOI: 10.1016/J.J P0WS0U R.2015.03.183.

*Primary Examiner* — Dung H Bui
(74) *Attorney, Agent, or Firm* — Ipsilon USA—NLO

(57) ABSTRACT

The invention relates to a cyclic method for capturing and utilizing $CO_2$ contained in a gas stream. The method uses three different materials, a first solid material, a second solid material and a $CO_2$ sorbent material.
In a first step a first gas stream comprising $CO_2$ and at least one reductant is brought in contact with the three materials, resulting in an outlet stream comprising water. In a second step, the captured $CO_2$ from the first step is released and converted to CO to produce a CO rich outlet stream. The invention further relates to an installation for capturing and utilizing $CO_2$.

10 Claims, 11 Drawing Sheets

(51) Int. Cl.
*B01J 20/04* (2006.01)
*C10K 1/32* (2006.01)

(52) U.S. Cl.
CPC ............... *B01D 2251/102* (2013.01); *B01D 2253/1122* (2013.01); *B01D 2257/504* (2013.01)

(58) Field of Classification Search
CPC ...... B01D 2251/102; B01D 2253/1122; B01D 2257/504; B01D 2251/404; B01D 2251/602; B01D 2251/11; B01D 2251/202; B01D 2251/208; B01D 2253/25; B01D 53/0423; B01J 20/041; B01J 20/0207; B01J 20/0222; B01J 20/0225; B01J 20/0229; B01J 20/0237; B01J 20/06; B01J 2220/42; Y02C 20/40
See application file for complete search history.

(56) References Cited

U.S. PATENT DOCUMENTS

| 10,549,232 | B1* | 2/2020 | Mendoza | B01D 53/1475 |
| 11,173,451 | B1* | 11/2021 | Lau | B01J 35/647 |
| 2009/0162268 | A1* | 6/2009 | Hufton | B01D 53/0462 |
| | | | | 423/656 |
| 2012/0230897 | A1* | 9/2012 | Abanades | B01D 53/62 |
| | | | | 423/230 |
| 2019/0321798 | A1* | 10/2019 | Steinfeld | C07C 1/02 |
| 2020/0246746 | A1* | 8/2020 | Mendoza | B01J 20/0277 |

FOREIGN PATENT DOCUMENTS

| EP | 2072111 A2 | 6/2009 |
| EP | 2789376 A1 | 10/2014 |
| WO | 2011/047409 A1 | 4/2011 |

* cited by examiner

METHOD TO CAPTURE AND UTILIZE CO₂ AND AN INSTALLATION FOR CAPTURING AND UTILIZING CO₂

FIELD OF THE INVENTION

The present invention relates to a method to capture and utilize $CO_2$ using a cyclic method whereby a gas stream comprising $CO_2$ is contacting a first solid material, a second solid material and a $CO_2$ capturing material. The invention further relates to an installation for capturing and utilizing $CO_2$.

BACKGROUND ART

Separation of $CO_2$ from a waste stream of an industrial source is a resource intensive process which is typically carried out in absorbers using an amine-based solvent. Upon separation of $CO_2$, the use and/or storage of $CO_2$ has to be further implemented by a separate process. This considerably increases the cost and impedes an efficient implementation of $CO_2$ capture and utilization.

One way to convert $CO_2$ to CO on an industrial scale is by applying the catalytic reverse water gas-shift reaction. The catalytic reverse water gas-shift reaction has however limited conversion of $CO_2$ to CO because of the thermodynamic limitation of the reactions. As the reaction is endothermic, a continuous supply of heat to reach temperatures typically above 1173 K (900° C.) is required to achieve appreciably high conversion of $CO_2$ to CO.

The cyclic reverse water-gas shift reaction resolves the reverse water-gas shift reaction temporally and/or spatially in two distinct steps using an oxygen storage material. The reactions occurring in the two steps are stated below:

Step 1—Reduction of the Oxygen Storage Material

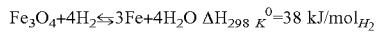

Step 2—Oxidation of the Oxygen Storage Material

The process makes use of a highly concentrated $H_2$ stream for shifting the equilibrium towards $H_2$ conversion in step 1. Similarly, a highly concentrated $CO_2$ stream is necessary for creating an equally concentrated CO stream. The process does however not cover the separation of $CO_2$; only its utilization.

Another variant of the cyclic reverse water-gas shift reaction involves the application of perovskites, which typically consist of rare-earth metals, as oxygen storage material and switching the temperature during reduction and oxidation steps. The use of perovskite offers sustained performance of the material after several cycles but running the process in two different temperature regimes (773 K and 1123 K (500° C. and 850° C.)) poses significant practical challenges in shifting temperatures.

Solar energy driven thermochemical splitting of $CO_2$ also involves a two-step process with an oxygen storage material which is typically a metal oxide ($MeO_x$). However, the heat for driving the processes is derived directly from renewable solar energy. The reactions involved in the process are displayed below:

Step 1—Reduction of the Oxygen Storage Material

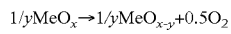

Step 2—Oxidation of Oxygen Storage Material

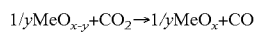

A drawback of such method is the very high temperatures that are required: step 1 of the process typically occurs between 1473 K and 1773 K (between 1200° C. and 1500° C.) whereas step 2 typically occurs between 1073 K and 1473 K (between 800° C. and 1200° C.). Because of these high temperatures involved in this process, the oxygen storage material is required to be extremely stable and have very high melting points.

A further drawback of this method is the requirement of a highly concentrated $CO_2$ input stream for an equally concentrated CO output stream.

Furthermore such method requires additional infrastructure such as solar concentrators and is dependent on the availability of natural sunlight.

SUMMARY OF THE INVENTION

It is an object of the present invention to provide a method of capturing and utilizing $CO_2$ avoiding the drawbacks of the prior art.

It is an object of the present invention to provide a method that combines $CO_2$ capture and $CO_2$ utilization.

It is another object of the present invention to provide a method of capturing and utilizing $CO_2$ whereby all heat that is required can be generated in-situ. The method does not require an external heat supply.

It is a further object of the present invention to provide a method that incorporates three processes, $CO_2$ capturing, $CO_2$ utilization and synthesis gas production in an integrated chemical looping process.

It is a further object of the present invention to provide a method comprising a first step in which a gas stream comprising $CO_2$ and at least one reductant is brought in contact with a first solid material, a second solid material and a $CO_2$ sorbent material resulting in an outlet stream comprising water and a second step in which the captured $CO_2$ from the first step is released and converted to CO to produce a CO rich outlet stream.

It is a further object of the present invention to provide a method that allows an operating temperature that is lower than the operating temperature of methods known in the art.

It is still a further object of the present invention to provide a method that does not impose high requirements on the materials used in the method.

According to a first aspect of the present invention a method of capturing and utilizing $CO_2$ contained in a gas stream is provided. The method is a cyclic method comprising a first and a second step.

The first step comprises introducing a first gas stream to contact a first solid material, a second solid material and a $CO_2$ sorbent material. The first gas stream comprises $CO_2$ and at least one reductant.

The second step comprises introducing a second gas stream to contact the $CO_2$ sorbent material, the second solid material and the first solid material. The second gas stream comprises at least one oxidant, for example $O_2$. The second gas stream comprises for example air.

The first solid material has a first thermodynamic equilibrium oxygen partial pressure referred to as $p1_{O_2,eq}$ and the second solid material has a second thermodynamic equilibrium oxygen partial pressure referred to as $p2_{O_2,eq}$. Preferably, at the process conditions of the first step and at the process conditions of the second step, the second thermodynamic equilibrium oxygen partial pressure $p2_{O_2,eq}$ is larger than the first thermodynamic equilibrium oxygen partial pressure $p1_{O_2,eq}$. The method according to the present invention is furthermore characterized in that the first solid material oxidizes the at least one reductant of the first gas stream at least partially in the first step and under the process conditions of the first step; and the first solid material is oxidized (possibly reversibly oxidized) by $CO_2$ in the second step and under the process conditions of the second step; and the second solid material oxidizes the at least one reductant in the first step and under the process conditions of the first step; and the second solid material is not oxidized by $CO_2$ and not oxidized by $H_2O$ in the second step and under the process conditions of the second step; and the $CO_2$ sorbent material is capturing $CO_2$ in the first step under the process conditions of the first step; and the $CO_2$ sorbent material is releasing $CO_2$, preferably the $CO_2$ captured in the first step, in the second step and under the process conditions of the second step.

The process conditions of the first step of the method according to the present invention comprise preferably a temperature ranging between 573 K and 1473 K (between 300 and 1200° C.) and a pressure ranging between 0.1 and 100 bar. More preferably, the process conditions of the first step of the method according to the present invention comprise a temperature ranging between 773 K and 1273 K (between 500 and 1000° C.), for example between 873 K and 1123 K (between 600 and 850° C.) and a pressure ranging between 1 and 10 bar, for example between 1 and 1.3 bar.

The process conditions of the second step of the method according to the present invention comprise preferably a temperature ranging between 573 K and 1473 K (between 300 and 1200° C.) and a pressure ranging between 0.01 and 10 bar. More preferably, the process conditions of the second step of the method according to the present invention comprise a temperature ranging between 773 K and 1273 K (between 500 and 1000° C.), for example between 973 K and 1123 K (between 700 and 850° C.) and a pressure ranging between 1 and 10 bar, for example between 1 and 1.3 bar.

In the first step the first gas stream comprising $CO_2$ and at least one reductant is brought in contact with the first solid material, the second solid material and the $CO_2$ sorbent material and leads to an outlet stream comprising water. In the second step, the captured $CO_2$ from the first step is preferably released and converted to CO to produce a CO rich outlet stream.

Preferably, the first and second step of the method according to the present invention are repeated periodically. A period can range from seconds to minutes and is amongst others dependent on the size of the reactor or reactors. A period ranges for example between 5 seconds and 120 minutes or between 10 seconds and 60 minutes. A period is for example 30 seconds, 1 minute, 5 minutes, 10 minutes, 20 minutes, 30 minutes or 60 minutes.

The first and second step of the method according to the present invention can be performed in a single reactor or alternatively in two different reactors, i.e. the first step in a first reactor and the second step in a second reactor.

Preferred methods comprise one or more intermediate steps, for example in the first step, in the second step or both in the first and the second step. An intermediate step can, for example, be introduced before or after contacting the first solid material, before or after contacting the second solid material or before or after contacting the $CO_2$ sorbent material, and this in the first step, in the second step or in both the first and the second step.

Intermediate steps comprise for example one or more pretreatment step(s) such as purging, for example purging with a gas, for example with an inert gas. Other intermediate step or steps comprise changing the process conditions, for example changing the temperature and/or changing the pressure.

The first solid material and the second solid material preferably comprise an oxygen storage material, for example a metal oxide ($MeO_x$). The first solid material and the second solid material comprise for example a metal oxide, respectively a first metal oxide ($Me_1O_x$) and a second metal oxide ($Me_2O_y$). A metal oxide is characterized by a thermodynamic equilibrium partial oxygen pressure ($p_{O_2,eq}$). The thermodynamic equilibrium partial oxygen pressure is dependent on the temperature and pressure.

As mentioned above the first solid material has a first thermodynamic oxygen equilibrium partial pressure referred to as $p1_{O_2,eq}$ and the second solid material has a second thermodynamic equilibrium oxygen partial pressure referred to as $p2_{O_2,eq}$. According to the present invention, the second thermodynamic equilibrium oxygen partial pressure $p2_{O_2,eq}$ is larger than the first thermodynamic equilibrium oxygen partial pressure $p1_{O_2,eq}$ at the process conditions of the first step and at the process conditions of the second step.

Preferably, the second thermodynamic equilibrium oxygen partial pressure $p2_{O_2,eq}$ is at least one order of magnitude larger than the first thermodynamic equilibrium oxygen partial pressure $p1_{O_2,eq}$ at the process conditions of the first step and at the process conditions of the second step. More preferably, the second thermodynamic equilibrium oxygen partial pressure $p2_{O_2,eq}$ is several orders of magnitude larger than the first thermodynamic equilibrium oxygen partial pressure $p1_{O_2,eq}$, for example 2, 3 or 4 orders of magnitude larger.

The thermodynamic equilibrium oxygen partial pressure of a solid material $MeO_x$ can be derived as illustrated below.

The reaction equation for a chemical reaction between molecular oxygen ($O_2$) in gas phase and such solid material ($MeO_x$) (can be given generically by equation (1):

$$2MeO_x \leftrightarrows 2MeO_{x-\delta} + \delta O_2 \tag{1}$$

with $\delta$ an arbitrary number dependent on the solid $MeO_x$.

The heat or enthalpy of this reaction is given by equation (2):

$$\Delta H^0 = \delta H_{O_2}^0 + 2H_{MeO_{x-\delta}}^0 - 2H_{MeO_x}^0 \tag{2}$$

with $H_{O_2}^0$, $H_{MeO_{x-\delta}}^0$ and $H_{MeO_x}^0$ being the standard enthalpies of $O_2$ (gas phase), $MeO_x$ (condensed phase), and $MeO_{x-\delta}$ (condensed phase) in J/mol at a given temperature of the reaction.

The change in entropy of the reaction is given by equation (3):

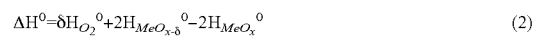

$$\Delta S^0 = \delta S_{O_2}^0 + 2S_{MeO_{x-\delta}}^0 - 2S_{MeO_x}^0 \tag{3}$$

With $S_{O_2}^0$, $S_{MeO_{x-\delta}}^0$ and $S_{MeO_x}^0$ being the standard entropies of $O_2$ (gas phase), $MeO_x$ (condensed phase), and $MeO_{x-\delta}$ (condensed phase) in J/mol/K at a given temperature of the reaction.

Numerical values of enthalpy and entropy for different substances at standard pressure (101325 Pa) can be found in widely available databases, as for example:

Shen, V. K., et al., eds. *NIST Standard Reference Simulation Website*. NIST Standard Reference Database Number 173. 2020: National Institute of Standards and Technology, Gaithersburg MD, 20899, USA;

Barin, I., in *Thermochemical Data of Pure Substances* (*volume* 3). 1995. p. 1-1848.

Bale, C. W., et al., *FactSage thermochemical software and databases,* 2010-2016. Calphad, 2016. 54: p. 35-53.

Combining equations (2) and (3), the Gibbs energy of the reaction can be computed. The relation between enthalpy, entropy, and Gibbs energy is given by equation (4).

$$\Delta G^0 = \Delta H^0 - T \Delta S^0 \qquad (4)$$

With T the temperature (in K) at which the reaction is carried out.

The thermodynamic equilibrium oxygen partial pressure is calculated using the Gibbs energy of the reaction using equation (5) and (6).

$$a_{O_2,eq} = e^{\frac{-\Delta G^0}{RT}} \qquad (5)$$

with $a_{O_2,eq}$ the activity of molecular $O_2$ at the reaction temperature T (in K), R the universal gas constant (8.314 J/mol/K).

For ideal gases, the activity is equal to the partial pressure of the gas. Thus, the thermodynamic equilibrium oxygen partial pressure of the gas in Pa is given by (6)

$$p_{O_2,eq} = a_{O_2,eq} * 101325 \qquad (6)$$

As most standard databases record the enthalpy and entropy at the reference standard pressure (101325 Pa), the activity is multiplied by 101325 Pa to yield the thermodynamic equilibrium oxygen partial pressure ($p_{O_2,eq}$) in Pa.

According to the present invention, the second thermodynamic equilibrium oxygen partial pressure $p2_{O_2,eq}$ is larger than the first thermodynamic equilibrium oxygen partial pressure $p1_{O_2,eq}$ at the process conditions of the first step and at the process conditions of the second step.

Because of its high thermodynamic equilibrium oxygen partial pressure, the second solid material will oxidize the at least one reductant in the first step under the process conditions of the first step. Preferably, the equilibrium of the reaction of the oxidation of the at least one reductant (for example fuel) is shifted to the right, resulting in a nearly complete or complete oxidation of the at least one reductant in the first step under the process conditions of the first step. The nearly complete or complete reaction is also referred to as an irreversible or nearly irreversible reaction.

The second thermodynamic equilibrium oxygen partial pressure $p2_{O_2,eq}$ is at the process conditions higher than necessary for reducing $CO_2$ to CO or C appreciably. Consequently, the second solid material can not be oxidized by $CO_2$. Similarly, the second solid material can not be oxidized by $H_2O$.

Preferably, the second reduced solid material is oxidized, for example by the at least one oxidant of the second gas stream, in the second step of the method under the process conditions of the second step. Preferably, the equilibrium of the oxidation of the second solid material by the at least one oxidant is shifted to the right, resulting in a (nearly) complete oxidation of the second solid material (a (nearly) irreversible oxidation of the second solid material).

Preferably, the second solid material has a sufficiently high affinity for the at least one oxidant in the second gas stream because of its equilibrium oxygen partial pressure being at least one order of magnitude higher than that of the equilibrium oxygen partial pressure necessary to reduce the oxidant in the second gas stream or the oxygen partial pressure in the second gas stream if the oxidant is oxygen.

This means that the equilibrium of the oxidation reaction of the second solid material is preferably shifted to the right, resulting in a nearly complete or complete oxidation of the second solid material in the second step under the process conditions of the second step. The nearly complete or complete reaction is also referred to as an irreversible or nearly irreversible reaction.

The first solid material oxidizes the at least one reductant of the first gas stream at least partially in the first step and under the process conditions of the first step. Preferably, the first solid material is reversibly reduced, in the first step of the method under the process conditions of the first step. The first solid material is for example reduced by CO in the first step of the method under the process conditions of the first step.

The first thermodynamic equilibrium oxygen partial pressure $p1_{O_2,eq}$ is preferably lower than the thermodynamic equilibrium oxygen partial pressure of $CO_2/CO$ mixtures and of $H_2O/H_2$ mixtures having a molar $CO_2/CO$ ratio and/or a molar $H_2O/H_2$ ratio ranging from 0.001 to 100 or from 0.1 to 10. This indicates that the first solid material can be oxidized by $CO_2$ and by $H_2O$.

More preferably, the first solid material is reversibly reduced, for example by CO, in the first step of the method under the process conditions of the first step and the second solid metal is (nearly) irreversibly oxidized, for example by the at least one oxidant in the second gas stream, in the second step of the method under the process conditions of the second step.

Preferably, the first solid material comprises a material comprising iron, cerium, zirconium, iridium, tungsten, lanthanum, strontium, manganese, molybdenum, samarium, neodymium or combinations thereof. The first solid material comprises for example $Fe/Fe_xO_y$ (for example FeO, $Fe_{0.932}O$, $Fe_3O_4$), $Ce/Ce_xO_y$ (for example $CeO_2$ or $Ce_2O_3$), $Ir/IrO_2$, $MoO_2/Mo$, $W/WO_3$ or $W/WO_2$, $La/La_2O_3$, $Sr/SrO$ or $Mn/Mn_2O_3$ or combinations thereof. Also mixed oxides, in particular mixed oxides comprising cerium, zirconium, iridium, tungsten, lanthanum, strontium, manganese, molybdenum, samarium and/or neodymium can be considered. Examples of mixed oxides comprise $Mn_xFe_{1-x}O$ (preferably with x ranging between 0.2 and 0.95), $La_{0.6}Sr_{0.4}FeO_3$ or $SmFeO_3$ or $NdFeO_3$.

The first solid material has preferably low or no reactivity with impurities and/or low or no reactivity with nitrogen.

Preferably, the second solid material comprises a material comprising manganese, nickel, copper, cobalt, iron, strontium, magnesium, titanium, calcium, lanthanum or combinations thereof. The second solid material comprises for example $Mn/MnO/MnO_2/MnO/Mn_3O_4/Mn_2O_3$, $Ni/NiO$, $Cu/Cu_2O/CuO$, $Fe_2O_3/Fe_3O_4$, $Co/CoO$ or combinations thereof. Also mixed oxides, in particular mixed oxides comprising manganese, nickel, copper, cobalt iron, strontium, magnesium, titanium, calcium and/or lanthanum can be considered. Examples of mixed oxides comprise $CuMn_2O_4$, $Cu_{1.5}Mn_{1.5}O_4$, $SrFeO_3$ or $Ca_xLa_{1-x}Mn_yM_{1-y}O_3$ (preferably with x and y ranging between 0 and 1 and with M being Mg, Fe, Ti, or Cu).

As $CO_2$ sorbent material any $CO_2$ sorbent material known in the art can be considered.

In the first step of the method according to the present invention the $CO_2$ sorbent material predominantly captures $CO_2$ under the process conditions of the first step, whereas $CO_2$ is predominantly released in the second step under the process conditions of the second step. Preferably, the $CO_2$ captured in the first step is released in the second step.

Preferred $CO_2$ sorbent materials comprise an alkali metal or alkaline earth metal or a combination thereof, optionally promoted with one or more elements selected from the group consisting of aluminum, cerium, zirconium, magnesium or combinations thereof.

Preferred $CO_2$ sorbent materials comprise CaO, optionally promoted with a doping element, preferably a doping element selected from the group consisting of aluminium, cerium, zirconium, magnesium or a combination thereof. The $CO_2$ sorbent material comprises for example CaO optionally promoted with $Al_2O_3$, $CeO_2$, $CaZrO_3$ or combinations thereof. Other preferred $CO_2$ sorbent materials comprise SrO, BaO, MgO, $Li_2ZrO_3$, $Li_4SiO_4$, $Li_6CoO_4$, $Li_5FeO_4$, $Li_6MnO_4$, $Li_2O$ or $LiAlO_4$, optionally promoted.

Preferably, the $CO_2$ sorbent material has low or no selectivity towards $H_2O$ chemisorption.

The first gas stream comprises $CO_2$ and at least one reductant. It is clear that the first gas stream may comprise a plurality of reductants.

The at least one reductant preferably comprises an organic compound, for example a hydrocarbon, an alcohol, $H_2$, CO or a mixture thereof. Examples of organic compounds comprise methane, ethane, ethylene, propane, propylene, butane, butylene, methanol, ethanol, propanol, dimethylether, benzene, toluene, tar and naptha.

The first gas stream comprises for example $CO_2$ and a carbonaceous fuel. It is clear that industrial gas streams comprising $CO_2$ are suitable as first gas stream. Also biogas is suitable as first gas stream.

The second gas stream comprises at least one oxidant. It is clear that the second gas stream may comprise a plurality of oxidants.

The at least one oxidant comprises for example $O_2$, NO, $NO_2$ or $N_2O$. The second gas stream comprises for example air, optionally air enriched with oxygen or air diluted with one or more (inert) gas(es), for example with $N_2$, He, Ar, Kr or mixtures thereof.

In preferred methods the first gas stream comprises $CO_2$ and a carbonaceous fuel and the second gas stream comprises air.

The method according to the present invention requires that the first and second gas stream are contacting three different materials, i.e. a first solid material, a second solid material and a $CO_2$ sorbent material. The sequence of the contact of the first gas stream with the three materials is however not crucial.

The first gas stream is for example subsequently contacting the first solid material, the second solid material and the $CO_2$ sorbent material in the first step and the second gas stream is subsequently contacting the $CO_2$ sorbent material, the second solid material and the first solid material in the second step. Other sequences of the materials can be considered as well.

In preferred methods the first gas stream and the second gas stream each subsequently contacts different zones, each zone comprising one material or a combination of different materials.

In a first preferred method the first gas stream is contacting respectively a first zone, a second zone, a third zone and a fourth zone and the second gas stream is contacting respectively the fourth zone, the third zone, the second zone and the first zone, with the first zone comprising a $CO_2$ sorbent material, the second zone comprising a first solid material and a $CO_2$ sorbent material, the third zone comprising a second solid material and a $CO_2$ sorbent material and the fourth zone comprising a $CO_2$ sorbent material.

In a second preferred method the first gas stream is contacting respectively a first zone and a second zone and the second gas stream is contacting respectively the second zone and the first zone, with the first zone comprising a first solid material and a $CO_2$ sorbent and the second zone comprising a second solid material and a $CO_2$ sorbent material.

It is clear that other configurations can be considered as well.

The first gas stream and the second gas stream can be introduced in the same direction or alternatively in opposite directions. In case the first gas stream and the second gas stream are introduced in the same direction, the first gas stream and the second gas stream are contacting the different zones in the same sequence. In case the first gas stream and the second gas stream are introduced in opposite directions, the first gas stream and the second gas stream are contacting the different zones in opposite sequence.

According to a second aspect of the present invention an installation for capturing and utilizing $CO_2$ is provided. The installation comprises at least one inlet for introducing a first gas stream comprising $CO_2$ and at least one reductant, at least one inlet for introducing a second gas stream comprising at least one oxidant, at least one outlet for providing a first outlet stream and at least one outlet for providing a second outlet stream. The at least one inlet for introducing the first gas stream and the at least one inlet for introducing the second gas stream can be the same. Alternatively, the installation can be provided with different inlets for example a first inlet for introducing a first gas stream and a second inlet for introducing a second gas stream. Similarly, the at least one outlet for providing a first outlet stream and the at least one outlet for providing a second outlet stream can be the same. Alternatively, the installation can be provided with different outlets for example a first outlet for providing a first outlet stream and a second outlet for providing a second outlet stream. The installation further comprises a first flow path extending from the at least one inlet for introducing the first gas stream to the at least one outlet to provide the first outlet stream, for example from the first inlet to the first outlet, and allowing the first gas stream to contact a first solid material, a second solid material and a $CO_2$ sorbent material and a second flow path extending from the at least one inlet for introducing the second gas stream to the at least one outlet to provide the second outlet stream, for example from the second inlet to the second outlet, and allowing the second gas stream to contact the first solid material, the second solid material and the $CO_2$ sorbent material. The first solid material has a first thermodynamic equilibrium oxygen partial pressure $p1_{O_2,eq}$ and the second solid material has a second thermodynamic equilibrium oxygen partial pressure $p2_{O_2,eq}$. Preferably, the second thermodynamic equilibrium oxygen partial pressure $p2_{O_2,eq}$ is larger than the first thermodynamic equilibrium oxygen partial pressure $p1_{O_2,eq}$ at a temperature ranging between 573 K and 1743 K and a pressure between 0.01 bar and 100 bar. The first solid material is in the first flow path and under the process conditions of the first flow path at least partially oxidizing the at least one reductant and the first solid material is oxidized by $CO_2$ in the second flow path and under the process conditions of the second flow path. The second solid material is in the first flow path and under the process conditions of the first flow path oxidizing the at least one reductant and the second solid material is neither oxidizing by $CO_2$ nor by $H_2O$ in the second flow path and under the process conditions of the second flow path. Preferably the second solid material is in the first flow path and under the process condition of the first flow path nearly completely or completely oxidizing the at least one reductant ((nearly) irreversibly oxidizing).

The installation according to the present invention may comprise a single reactor whereby the first flow path and the second flow path are provided in this reactor or may comprise two reactors whereby the first flow path is provided in the first reactor and the second flow path in the second reactor.

BRIEF DESCRIPTION OF THE DRAWINGS

The present invention will be discussed in more detail below, with reference to the attached drawings, in which.

DESCRIPTION OF EMBODIMENTS

Figure 1:
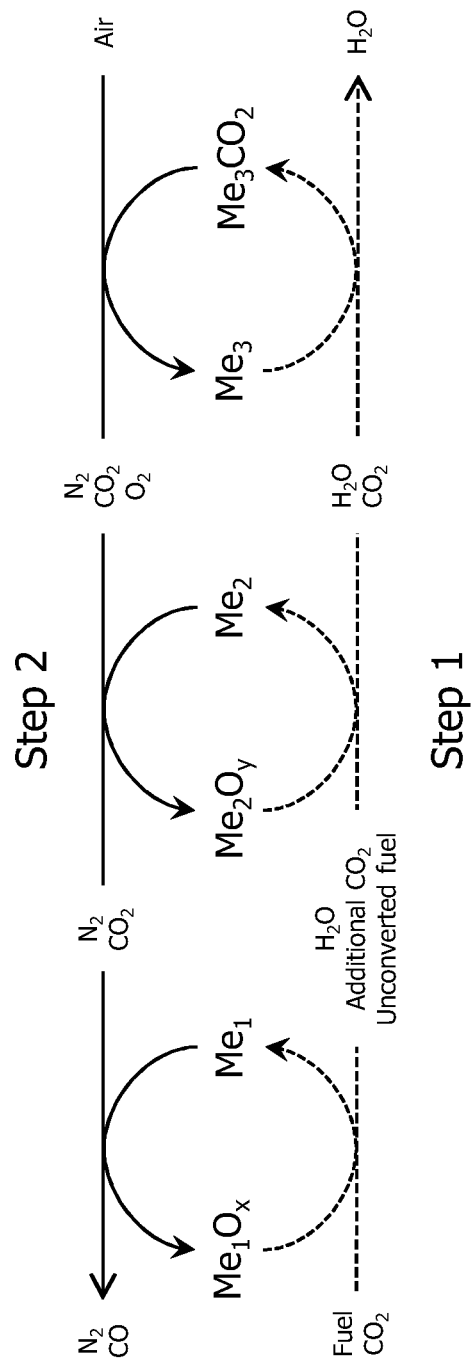
FIG. 1 schematically shows the reactions of a first method of capturing and utilizing $CO_2$ in a method according to the present invention.

The present invention will be described with respect to particular embodiments and with reference to certain drawings, but the invention is not limited thereto but only by the claims. The drawings are only schematic and are non-limiting. The size of some of the elements in the drawings may be exaggerated and not drawn on scale for illustrative purposes. The dimensions and the relative dimensions do not correspond to actual reductions to practice of the invention.

When referring to the endpoints of a range, the endpoints values of the range are included.

When describing the invention, the terms used are construed in accordance with the following definitions, unless indicated otherwise.

The term 'and/or' when listing two or more items, means that any one of the listed items can by employed by itself or that any combination of two or more of the listed items can be employed.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

For the purpose of the present application, a chemical looping process is defined as a chemical reaction with solid intermediates that is split into multiple sub-reactions and either executed in separate reactors or in alternating manner in a single reactor.

Oxygen storage material is defined as a solid intermediate which can exchange oxygen during a chemical looping process.

A $CO_2$ sorbent is defined as a material, often containing (earth) alkali metal oxides, which can periodically capture and release $CO_2$ by formation and decomposition of metal carbonate, for example (earth) alkali metal carbonate.

A catalyst is defined as a substance or material, which through repeated cycles of elementary steps, accelerates the conversion of reagents into products. Catalysts may comprise homogeneous catalysts, which are in the same phase with the reagents (for example acids and bases, metal complexes, etc.), and heterogeneous catalysts, which are separated from the reactants by an interface (for example metals, metal oxide, etc.).

Syngas is defined as a (variable) composition mixture of hydrogen and carbon monoxide.

FIG. 1 schematically shows the reactions of a method for capturing and utilizing $CO_2$ according to the present invention. The dashed-lines in the lower half-circles indicate the reactions in the first step, the lines in the upper half-circles indicate the reactions in the second step.

Figure 2:
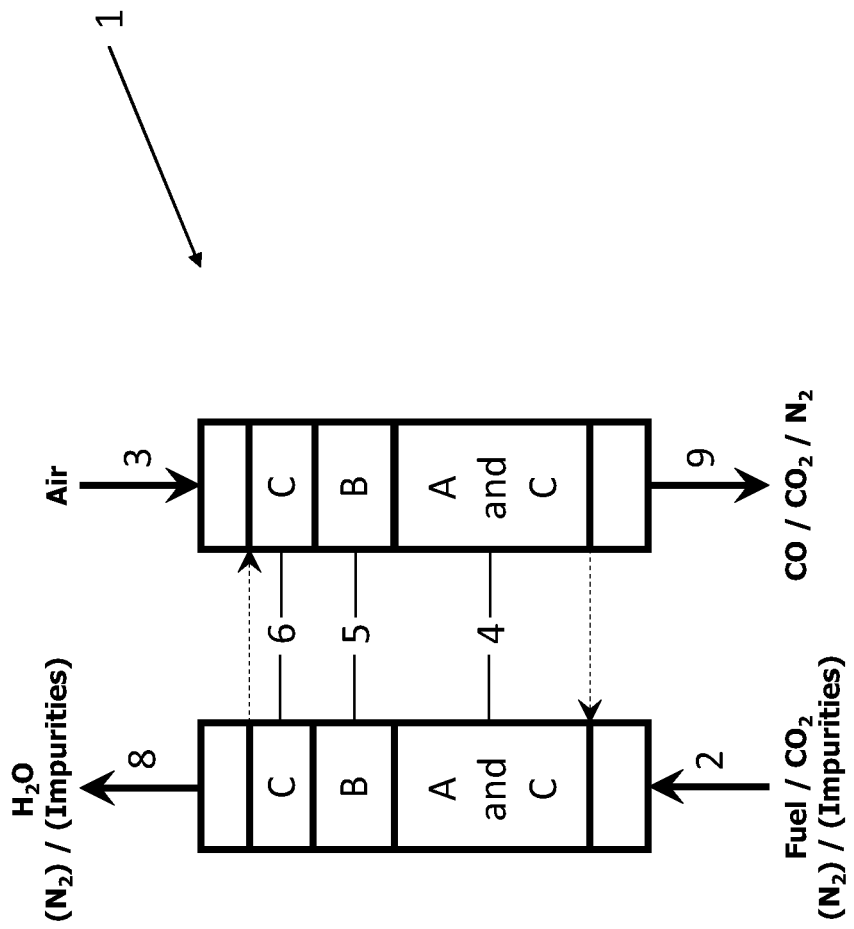
FIGS. 2-9 show a schematic illustration of different embodiments of a reactor for capturing and utilizing $CO_2$ according to the present invention.

FIG. 2 shows an example of an installation for capturing and utilizing $CO_2$ based on the reactions shown in FIG. 1. The installation shown in FIG. 2 comprises a fixed bed reactor. It should be clear that other types of reactors such as fluidized bed reactors and moving bed reactors can be considered as well.

The installation 1 comprises at least three different materials, preferably at least three different metal oxides. The installation 1 comprises for example a first solid material A comprising $Me_1O_x/Me_1$, a second solid material B comprising $Me_2O_y/Me_2$ and a $CO_2$ sorbent material C comprising $Me_3/Me_3CO_2$. The method comprises preferably two sequential steps, i.e. step 1 and step 2.

The first solid material A comprises for example $Fe_xO_y$; the second solid material B comprises for example $MnO_x$ and the $CO_2$ sorbent material C comprises for example CaO, optionally promoted with $Al_2O_3$, $CeO_2$, MgO, or, $ZrO_2$.

In the first step fuel and $CO_2$ is introduced as first gas stream 2. The first gas stream 2 may further comprise $N_2$ and/or impurities. The first gas stream 2 comprises for example an industrial gas stream comprising $CO_2$. The first gas stream 2 may also comprise a biogas. In the second step air is introduced as second gas stream 3.

The reactor 1 shown in FIG. 2 schematically shows a fixed bed reactor 1, having different zones 4, 5, 6. The first zone 4 comprises a first solid material A (for example $Fe_xO_y$) and a $CO_2$ sorbent material C (for example CaO, optionally promoted with $Al_2O_3$, $CeO_2$, MgO, or, $ZrO_2$); the second zone 5 comprises the second solid material B (for example $MnO_x$) and the third zone comprises for example a $CO_2$ sorbent material C (for example CaO, optionally promoted with $Al_2O_3$, $CeO_2$, MgO, or, $ZrO_2$). The first gas stream 2 is introduced to contact first the first zone 4 and subsequently the second zone 5 and the third zone 6. The second gas stream is introduced to contact first the third zone 6 and subsequently the second zone 5 and the first zone 4. The reactor 1 is provided with a first outlet 8 and a second outlet 9.

The following reactions occur in the first step and in the second step, in the different zones:

TABLE 1

| | 1st step | 2nd step |
|---|---|---|
| 1st zone (4) | $C_mH_nO_p$ (fuel) + $Me_1O_x$ ⇆ $Me_1O_{x-m+p}$ + n/2 $H_2$ + m CO<br>$Me_1O_x + H_2$ ⇆ $Me_1O_x + H_2O$<br>$Me_1O_x + CO$ ⇆ $Me_1O_x + CO_2$<br>$Me_3 + CO_2$ ⇆ $Me_3CO_2$ | $Me_1O_{x-1} + CO_2$ ⇆ $Me_1O_x + CO$<br>$Me_1O_{x-m+p} + (m-p) CO_2$ ⇆ $Me_1O_x + (m-p) CO$<br>$Me_3CO_2$ ⇆ $Me_3 + CO_2$ |
| 2nd zone (5) | $C_mH_nO_p$ (fuel) + $Me_2O_y$ → $Me_2O_{y-2m-0.5n+p}$ + n/2 $H_2O$ + m $CO_2$ | (m + 0.25n − 0.5p) $O_2$ + $Me_2O_{y-2m-0.5n+p}$ → $Me_2O_y$ |
| 3rd zone (6) | $Me_3 + CO_2$ ⇆ $Me_3CO_2$ | $Me_3CO_2$ ⇆ $Me_3 + CO_2$ |

Figure 3:
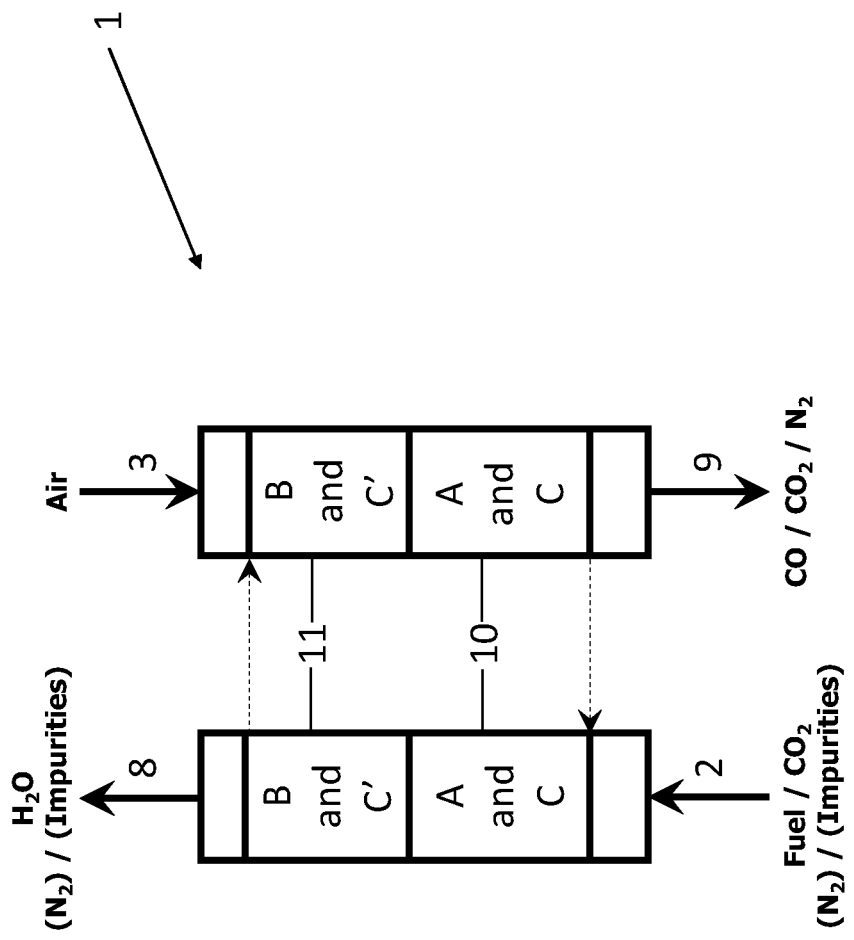

FIG. 3 shows an alternative installation 1 of a fixed bed reactor comprising a first zone 10 and a second zone 11. The first zone 10 comprises a first solid material A and a $CO_2$ sorbent material C; the second zone 11 comprises a second solid material B and a $CO_2$ sorbent material C'. The $CO_2$ sorbent material C' of the second zone 11 can be the same as the $CO_2$ sorbent material C of the first zone 10. Alternatively, the second zone 11 comprises another $CO_2$ sorbent material C' than the first zone 10. The first gas stream 2 is introduced to contact first the first zone 10 and subsequently the second zone 11. The second gas stream 3 is introduced to contact first the second zone 11 and subsequently the first zone 10. The reactor 1 is provided with a first outlet 8 and a second outlet 9.

Figure 4:
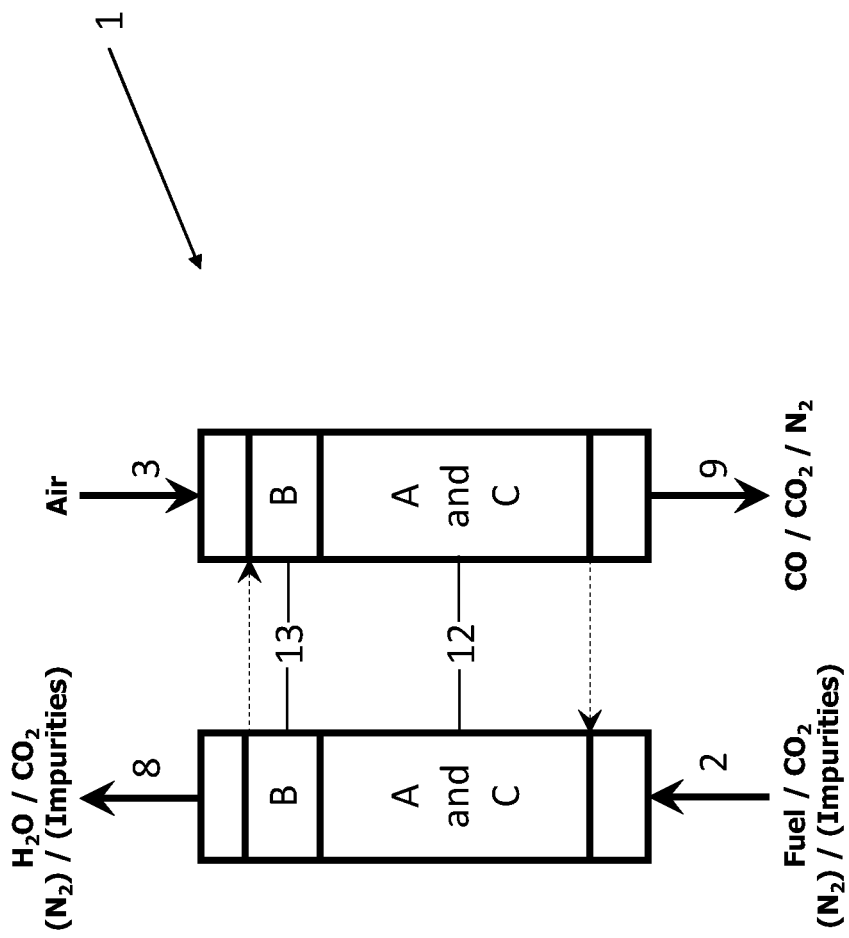

FIG. 4 shows an alternative installation of a fixed bed reactor 1 comprising a first zone 12 and a second zone 13. The first zone 12 comprises a first solid material A and a $CO_2$ sorbent material C; the second zone 13 comprises a second solid material B. The first gas stream 2 is introduced to contact first the first zone 12 and subsequently the second zone 13. The second gas stream 3 is introduced to contact first the second zone 13 and subsequently the first zone 12. The reactor 1 is provided with a first outlet 8 and a second outlet 9.

Figure 5:
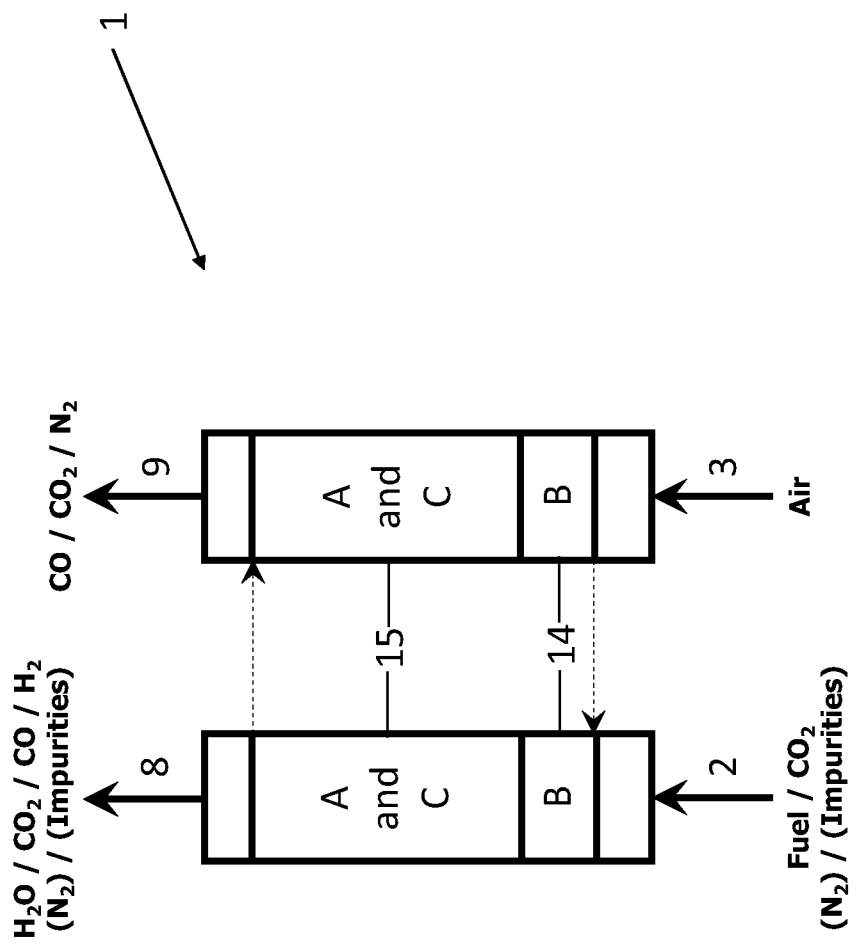

FIG. 5 shows a further embodiment of a reactor 1 according to the present invention. The reactor comprises a first zone 14 and a second zone 15. The first zone 14 comprises a second solid material B. The second zone 15 comprises a first solid material A and a $CO_2$ sorbent material C. Both the first gas stream 2 and the second gas stream 3 are introduced to contact first the first zone 14 and subsequently the second zone 15. The reactor 1 is provided with a first outlet 8 and a second outlet 9.

Figure 6:
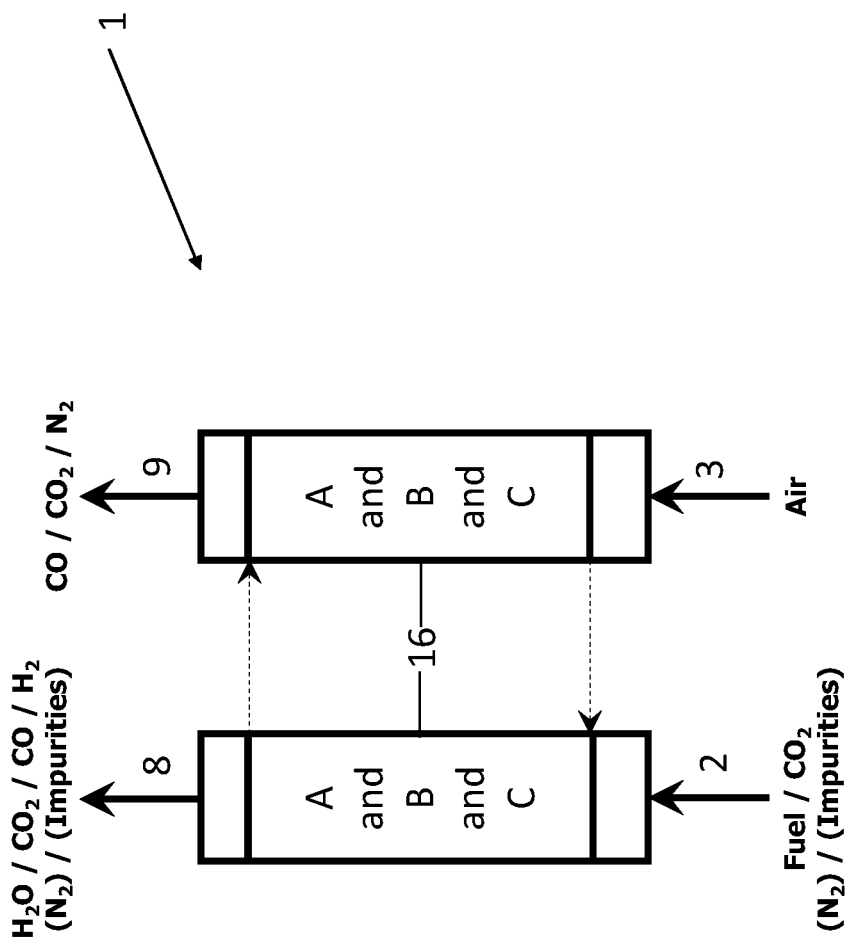

FIG. 6 shows a further embodiment of an installation of a reactor according to the present invention comprising one zone 16 comprising a first solid material A, a second solid material B and a $CO_2$ sorbent material C. The first gas stream 2 and the second gas stream 3 are introduced in the same direction. The reactor 1 is provided with a first outlet 8 and a second outlet 9.

Figure 7:
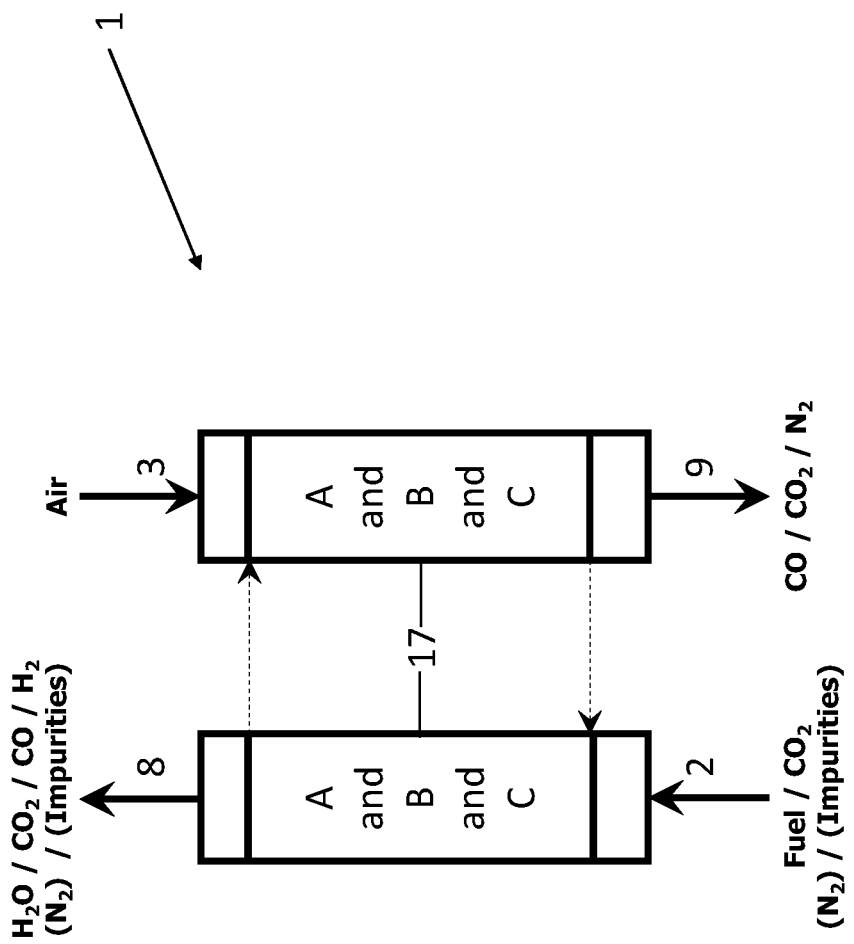

The reactor of FIG. 7 corresponds with the reactor of FIG. 6 comprising one zone 17 comprising a first solid material A, a second solid material B and a $CO_2$ sorbent material C, the first gas stream 2 and the second gas stream 3 are however introduced in opposite directions.

Figure 8:
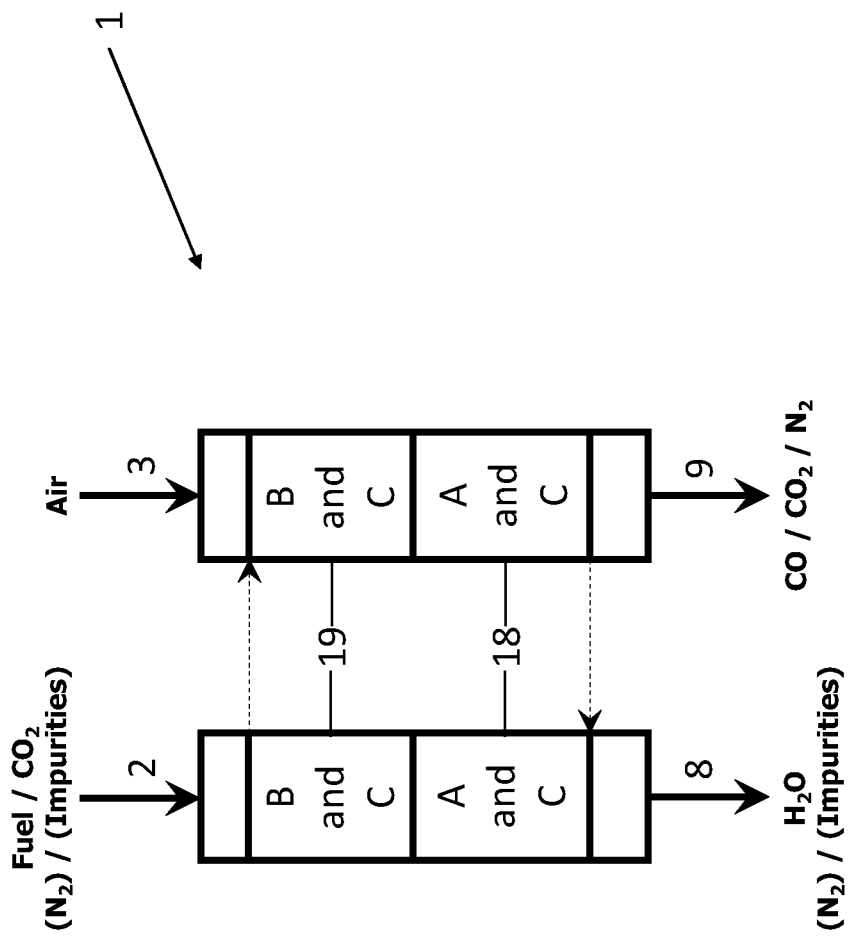

FIG. 8 shows a further embodiment of a reactor 1 according to the present invention. The reactor comprises a first zone 18 and a second zone 19. The first zone 18 comprises a first solid material A and a $CO_2$ sorbent material C. The second zone 19 comprises a second solid material B and a $CO_2$ sorbent material C. Both the first gas stream 2 and the second as stream are introduced to contact first the second zone 19 and subsequently the first zone 18. The reactor 1 is provided with a first outlet 8 and a second outlet 9.

Figure 9:
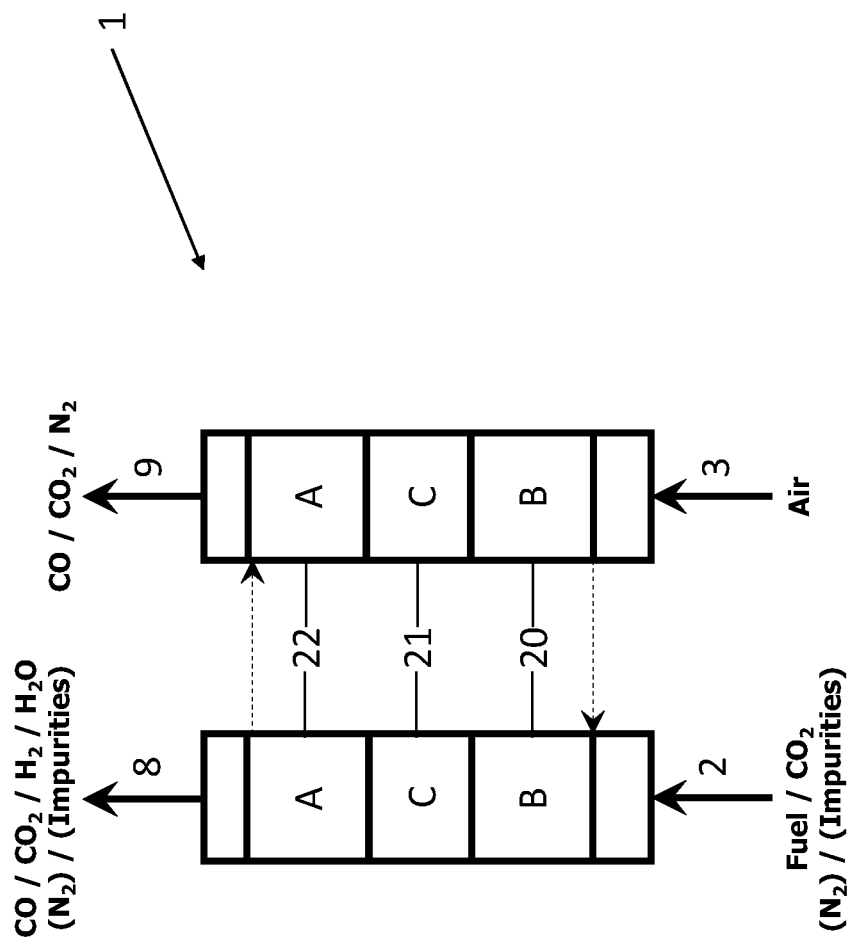

FIG. 9 shows a further embodiment of a reactor 1 according to the present invention. The reactor comprises a first zone 20, a second zone 21 and a third zone 22. The first zone 20 comprises a second solid material B. The second zone 21 comprises a $CO_2$ sorbent material C. The third zone 22 comprises a first solid material A. The first gas stream 2 is introduced to contact first the first zone 20 and subsequently the second zone 21 and the third zone 22. The second gas stream 3 is introduced to contact first the first zone 20 and subsequently the second zone 21 and the third zone 22. The reactor 1 is provided with a first outlet 8 and a second outlet 9.

Figure 10:
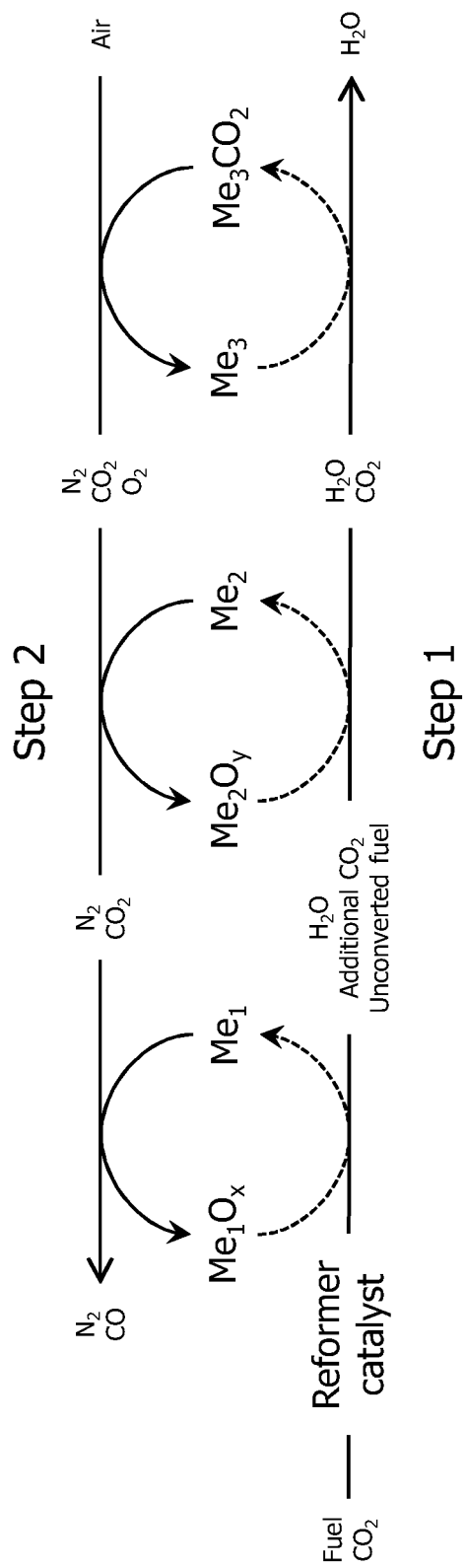
FIG. 10 schematically shows the reactions of an alternative method of capturing and utilizing $CO_2$ in a method according to the present invention.
Figure 11:
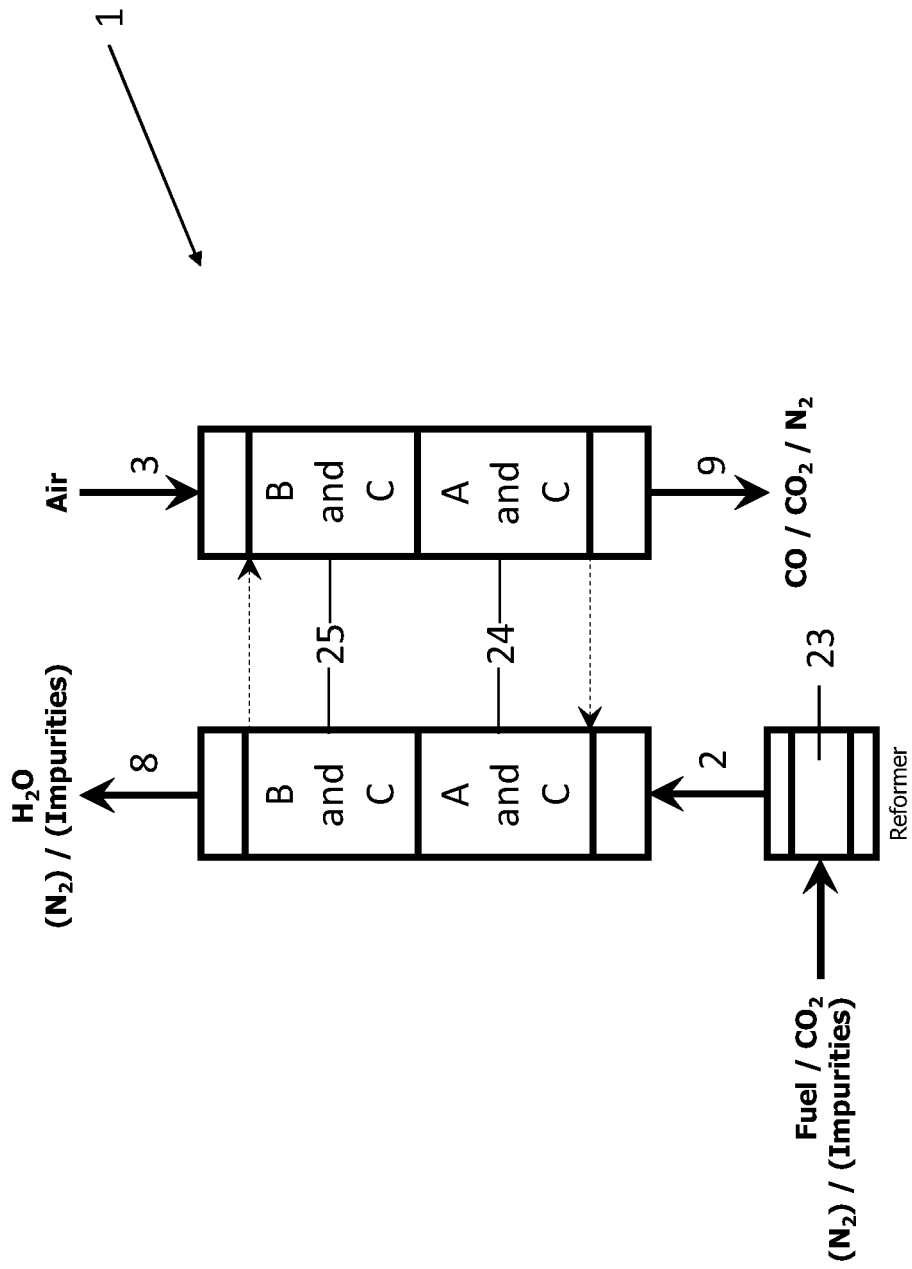
FIG. 11 shows a schematic illustration of an alternative reactor for capturing and utilizing $CO_2$ according to the present invention.

FIG. 10 schematically shows the reactions of a second method to capture and utilize $CO_2$ according to the present invention similar to FIG. 1 but comprising a reformer catalyst. FIG. 11 shows an example of an installation for capturing and utilizing $CO_2$ based on the reactions shown in FIG. 10, including a reforming catalyst.

The reforming catalyst can, for example, be a Ni-, Re- or Cu-based catalyst or a noble metal based catalyst such as a Pt- or Rh-based catalyst.

FIG. 11 shows an embodiment of a reactor 1 further comprising a reformer catalyst 23. The reactor comprises a first zone 24 and a second zone 24. The first zone 24 comprises a first solid material A and a $CO_2$ sorbent material C. The second zone 25 comprises a second solid material B and a $CO_2$ sorbent material C. The first gas stream 2 is introduced to contact first the reformer catalyst 23 and subsequently the first zone 24 and the second zone 25. The second gas stream 3 is introduced to contact first the second zone 25 and subsequently the first zone 24. The reactor 1 is provided with a first outlet 8 and a second outlet 9.

Experimental Results

A proof of concept experiment involved testing the three materials in a fixed bed reactor enclosed in an electrically heated furnace. The reactor made from quartz glass had an internal diameter of about 7.5 mm. Mass flow controllers by Bronkhorst (EL-Flow) were used for sending known quantities of reactant and/or inert gases into the reactor. For the analysis of the output gas streams from the reactor, a mass spectrometer was used with Ar as an internal standard gas for quantification purposes.

About 1.4 g of a conventional manganese-based oxygen carrier was used as solid material (second solid material) in a first zone of the reactor. A second zone of the reactor comprises a mixture of 1 g of a conventional calcium oxide based $CO_2$ sorbent and about 1 g of a conventional iron-based oxygen carrier. The first gas stream was introduced in the reactor to follow a flow path wherein first the first zone is contacted and subsequently the second zone is contacted. The second gas stream was introduced in the reactor to follow the same flow path of the first gas stream, i.e. to first contact the first zone and subsequently the second zone. This experiment's configuration applied the embodiment displayed in FIG. 5.

The first gas stream comprises a mixture of CO, $H_2$, $CO_2$ and an inert mixture of Ar and He and resembles the composition of a gas from a steel mill with $N_2$ replaced by an inert mixture of Ar and He. The molar ratio between the gases, $H_2$, CO, $CO_2$, Ar, and He was approximately 1:5:5:8:1. The second gas stream comprises a mixture of $O_2$ and Ar with a molar ratio of approximately 1:19. A fast switching pneumatic valve was used to switch from the first gas stream to the second gas stream. Throughout the experiment, the flow of the input gases (the first and the second gas stream) fed into the reactor was kept constant at about 6.1 mmol/min.

With the use of three-zone external heating of the fixed bed reactor, a uniform temperature of about 1023 K (750° C.) was maintained. A type K thermocouple was placed inside zone 2 for measuring the temperature of the bed. The pressure was kept constant between 1.1 to 1.3 bar, very close to ambient pressure, and maintained throughout the experiment.

In a typical cycle, the first step (reduction) and the second step (oxidation) of the cyclic method were prolonged to about 20 seconds. During the first step (reduction), on an $H_2O$-free basis the first outlet had the measured output molar ratio of $H_2$, CO, $CO_2$, Ar, and He was approximately 1:0.3:1:29:5 over its duration (compared to 1:5:5:8:1 in the feed gas). The enrichment of the inert content in the gas indicated high utilisation of the chemical energy of the incoming feed gas and $CO_2$ capture from the incoming feed gas. The presence of unreacted $H_2$ and CO represents an opportunity to further optimise the results (for example, by shortening the cycle times).

During the second step (oxidation), the second outlet stream had the following molar composition on an $H_2O$-free basis: 3% CO, 5% $CO_2$, 91% Ar, and less than 1% Hz. The presence of Hz during oxidation when $O_2$ and Ar were fed may be indicative of clogged water in the lines being purged into the reactor by $O_2$/Ar flow and/or the non-ideal response of the switch from first inlet stream to the second inlet stream. Although the use of Ar or any other inert is beneficial in the second step, its use may be minimised or almost eliminated by generating heat by the use of a stronger oxidising mixture like air. The presence of CO in the experimental results despite an input of $O_2$ at about 1023 K (750° C.) proves that a CO-rich stream is feasible from this approach. Further optimisation of the experiment could possibly lead to absence of Hz, further minimisation of Ar used in the second outlet stream, and a higher ratio of CO:$CO_2$ (current experimental results indicate a ratio of 0.6).

The thermodynamic equilibrium partial oxygen pressure of the solid materials used in the above mentioned proof of concept experiment manganese-based oxygen ($MnO_x$) carrier (($MnO_x$) as second solid material) and iron-based oxygen carrier ($FeO_x$) as first solid material are calculated below.

The total pressure in the experiment was close to the ambient pressure. At the reaction temperature of 1023 K, reactions (7) to (10) should be considered.

$$6Mn_2O_3 \rightleftharpoons 4Mn_3O_4 + O_2 \quad (7)$$

$$2Mn_3O_4 \rightleftharpoons 6MnO + O_2 \quad (8)$$

$$2Fe_3O_4 \rightleftharpoons 6FeO + O_2 \quad (9)$$

$$2FeO \rightleftharpoons 2Fe + O_2 \quad (10)$$

The thermodynamic calculations for estimating the thermodynamic equilibrium oxygen partial pressure $p_{O_2, eq_{1023\,K}}$ of the different materials are presented in Table 2. From the values of $p_{O_2, eq_{1023\,K}}$ presented in Table 2, it is clear that the second solid material ($Mn_2O_3$ and $Mn_3O_4$ among $MnO_x$ species) has a thermodynamic equilibrium oxygen partial pressure several orders of magnitude greater than that of the first solid material ($Fe_3O_4$ and FeO among $FeO_x$ species).

TABLE 2

Standard thermodynamic properties of solid components at 1023 K (reaction temperature)

| Reaction equation | $\Delta H^0_{1023\,K}\left(\frac{J}{mol}\right)$ | $\Delta S^0_{1023\,K}\left(\frac{J}{mol.K}\right)$ | $\Delta G^0_{1023\,K}\left(\frac{J}{mol}\right)$ | $p_{O_2, eq_{1023K}}$(Pa) |
|---|---|---|---|---|
| (7) | 217901 | 175 | 38815 | 1057 |
| (8) | 463106 | 233 | 294933 | $9 * 10^{-11}$ |
| (9) | 604374 | 217 | 381892 | $3.2 * 10^{-15}$ |
| (10) | 526444 | 128 | 395705 | $6.3 * 10^{-16}$ |

The invention claimed is:

1. Cyclic method of capturing and utilizing $CO_2$ contained in a gas stream, said method comprising a first and a second step wherein
    said first step comprises introducing a first gas stream to contact a first solid material, a second solid material and a $CO_2$ sorbent material, said first gas stream comprising $CO_2$ and at least one reductant, with the process conditions of said first step comprising a temperature ranging between 573 K and 1473 K and a pressure ranging between 0.1 and 100 bar;
    said second step comprises introducing a second gas stream to contact said $CO_2$ sorbent material, said second solid material and said first solid material, said second gas stream comprising at least one oxidant, said oxidant comprising oxygen or nitrogen oxides with the process conditions of said second step comprising a temperature ranging between 573 K and 1473 K and a pressure ranging between 0.01 and 10 bar;
    wherein said first solid material has a first thermodynamic equilibrium oxygen partial pressure and said second solid material having a second thermodynamic equilibrium oxygen partial pressure, with said second thermodynamic equilibrium oxygen partial pressure being larger than said first thermodynamic equilibrium oxygen partial pressure at the process conditions of said first step and at the process conditions of said second step,
    wherein said first solid material oxidizes said at least one reductant at least partially in said first step and under the process conditions of said first step and said first solid material is oxidized by $CO_2$ in said second step and under the process conditions of said second step and wherein said second solid material oxidizes said at least one reductant in said first step and under the process conditions of said first step and said second solid material is not oxidized by $CO_2$ and not oxidized by $H_2O$ in said second step and under the process conditions of said second step and
wherein said $CO_2$ sorbent material is capturing $CO_2$ in said first step under the process conditions of said first step and said $CO_2$ sorbent material is releasing $CO_2$, in said second step and under the process conditions of said second step.

2. The method according to claim 1, wherein said second thermodynamic equilibrium oxygen partial pressure is at least one order of magnitude larger than said first thermodynamic equilibrium oxygen partial pressure at the process conditions of said first step and at the process conditions of said second step.

3. The method according to claim 1, wherein said first step and said second step are repeated periodically and/or wherein said method comprises in said first and/or in said second step one or more intermediate steps before or after contacting said first solid material and/or before or after contacting said second solid material and/or before or after contacting said CO2 sorbent material.

4. The method according to claim 1, wherein said second solid material is oxidized in said second step and under the process conditions of said second step.

5. The method according to claim 1, wherein said first solid material is reversibly reduced in said first step and under the process conditions of said first step.

6. The method according to claim 1, wherein said first solid material comprises a material comprising iron, cerium, zirconium, iridium, tungsten, molybdenum, lanthanum, strontium, samarium, neodymium, manganese or combinations thereof.

7. The method according to claim 1, wherein said second solid material comprises a material comprising manganese, nickel, copper, cobalt, iron, strontium, magnesium, titanium, calcium, lanthanum or combinations thereof.

8. The method according to claim 1, wherein said $CO_2$ sorbent material comprises an alkali metal or alkaline earth metal and wherein said $CO_2$ sorbent material is optionally promoted with a doping element selected from the group selected from the group consisting of aluminium, cerium, zirconium, magnesium or combinations thereof.

9. The method according to claim 1, wherein said at least one reductant comprises an organic compound, an alcohol, CO, $H_2$ or a mixture thereof.

10. The method according to claim 1, wherein said first gas stream is subsequently contacting said first solid material, said second solid material and said $CO_2$ sorbent material in said first step and said second gas stream is subsequently contacting said $CO_2$ sorbent material, said second solid material and said first solid material in said second step.

* * * * *